US012622369B2

(12) United States Patent
Steininger

(10) Patent No.: US 12,622,369 B2
(45) Date of Patent: *May 12, 2026

---

(54) DEVICE FOR HARVESTING TIMBER

(71) Applicant: Werner Steininger, Peuerbach (AT)

(72) Inventor: Werner Steininger, Peuerbach (AT)

( * ) Notice: Subject to any disclaimer, the term of this patent is extended or adjusted under 35 U.S.C. 154(b) by 277 days.

This patent is subject to a terminal disclaimer.

(21) Appl. No.: 18/561,942

(22) PCT Filed: May 24, 2022

(86) PCT No.: PCT/EP2022/064035
§ 371 (c)(1),
(2) Date: Nov. 17, 2023

(87) PCT Pub. No.: WO2022/253634
PCT Pub. Date: Dec. 8, 2022

(65) Prior Publication Data
US 2024/0237594 A1     Jul. 18, 2024

(30) Foreign Application Priority Data

Jun. 2, 2021   (AT) .............................. A 50445/2021

(51) Int. Cl.
*A01G 23/091*          (2006.01)
(52) U.S. Cl.
CPC .................................. *A01G 23/091* (2013.01)
(58) Field of Classification Search
CPC .... A01G 23/08; A01G 23/083; A01G 23/091;
A01G 23/095
See application file for complete search history.

(56) References Cited

U.S. PATENT DOCUMENTS

| | | | | | |
|---|---|---|---|---|---|
| 5,267,594 A | * | 12/1993 | Wiemeri | .............. | A01G 23/091 |
| | | | | | 144/34.1 |
| 5,954,105 A | * | 9/1999 | Smith | .................. | A01G 23/095 |
| | | | | | 144/34.1 |
| 10,485,189 B2 | * | 11/2019 | Kaye | ...................... | A01G 23/02 |

FOREIGN PATENT DOCUMENTS

| | | |
|---|---|---|
| CA | 2 650 748 | 7/2010 |
| EP | 3 097 772 | 11/2016 |

(Continued)

OTHER PUBLICATIONS

Int'l Search Report (Form PCT/ISA/210) conducted in Int'l Appln. No. PCT/EP2022/064035 (Sep. 22, 2022).

(Continued)

*Primary Examiner* — Matthew Katcoff
(74) *Attorney, Agent, or Firm* — GREENBLUM & BERNSTEIN, P.L.C.

(57)          ABSTRACT

Device for timber harvesting having a felling head which includes a gripper and saw unit and a tilting device. The gripper and saw unit have gripper arms which can be actuated by a first hydraulic cylinder and a cutting element which can be pivoted out by a second hydraulic cylinder, and can be pivoted from a depositing position into a cutting position for the harvested material with the aid of the tilting device, which can be actuated by a third hydraulic cylinder. The first hydraulic cylinder is connected to a first hydraulic line for opening the gripper arms and to a second hydraulic line for closing the gripper arms. The tilting device can be pivoted from its cutting position into its depositing position by pressurizing the second hydraulic line in a pressure range in which the cutting element remains in an inactive state.

8 Claims, 4 Drawing Sheets

(56) References Cited

FOREIGN PATENT DOCUMENTS

Figure 1:
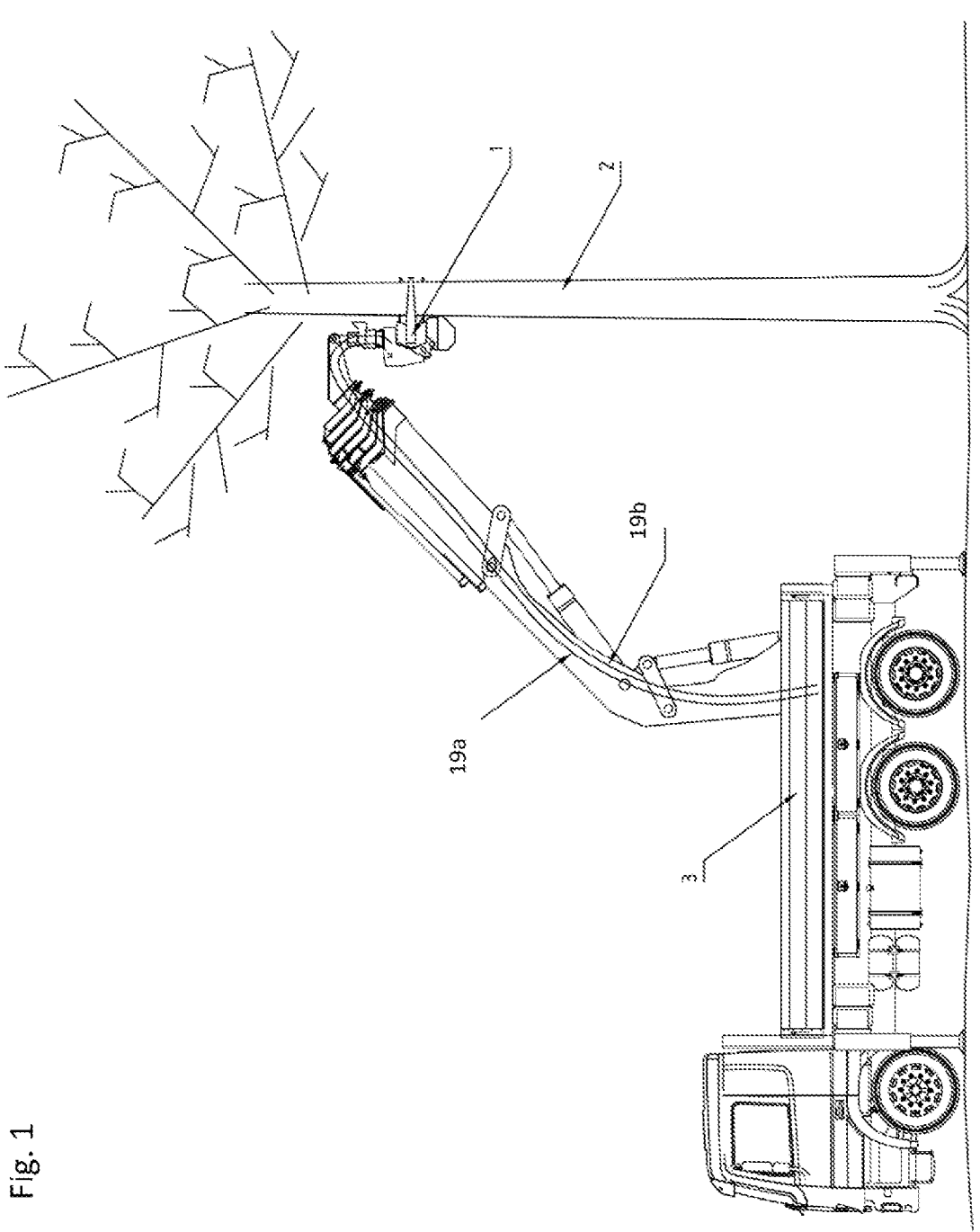

| IT | 201800007247 | 1/2020 |
| WO | 2011/078673 | 6/2011 |

OTHER PUBLICATIONS

Int'l Written Opinion (Form PCT/ISA/237) conducted in Int'l Appln. No. PCT/EP2022/064035 (Sep. 22, 2022).

* cited by examiner

DEVICE FOR HARVESTING TIMBER

The invention relates to a device for timber harvesting having a hydraulically controlled felling head, which can be attached to the boom arm of a vehicle and comprises a gripper and saw unit and a tilting device, wherein the gripper and saw unit has at least one pair of two gripper arms for harvested material, which can be actuated by a first hydraulic cylinder and pivoted between an open and closed state, and a hydraulically activatable cutting element for cutting through the harvested material, and can be pivoted from a depositing position into a cutting position for the harvested material by means of the hydraulically actuatable tilting device, wherein the gripper arms of the gripper and saw unit can be pivoted into the open state and the tilting device can be pivoted into its cutting position by pressurizing a first hydraulic line, and the gripper arms can be pivoted into the closed state and the cutting element is activated for cutting through harvested material by pressurizing a second hydraulic line, according to the preamble of claim 1.

Devices of this type are used for timber harvesting, wherein an operator controls a boom arm from the vehicle in such a way that gripper arms arranged on a gripper and saw unit embrace the harvested material, such as a tree trunk, wherein a closing pressure is subsequently exerted on the gripper arms via a corresponding hydraulic system via the second hydraulic line mentioned at the beginning and a first hydraulic cylinder, which fix the tree trunk relative to the boom arm via a pincer-like movement. Once the tree trunk has been fixed, the cutting element can be pivoted using a second hydraulic cylinder so that the tree trunk is cut through. The cutting element is designed as a chainsaw and is usually pivotably mounted in a saw box, wherein it can be put into operation using a hydraulic motor arranged in the saw box and swung out of the saw box using a hydraulically operated pivot drive in order to cut through a tree trunk held by the gripper arms in an area below the gripper arms. After cutting through the tree trunk, the gripper and saw unit can be pivoted using the tilting device so that the gripper arms are moved from their cutting position, in which the gripper arms are essentially horizontally oriented and their gripper pivot axes are correspondingly vertical, to a depositing position, in which the gripper arms are essentially vertically oriented and their gripper pivot axes are correspondingly horizontal. The severed tree trunk can then be deposited by activating the boom arm accordingly, wherein the gripper arms are opened via the first hydraulic line mentioned above and a corresponding resetting movement of the first hydraulic cylinder in order to release the severed tree trunk. With the aid of the third hydraulic cylinder and the tilting device, the gripper and saw unit can be moved from its depositing position back to its cutting position.

The hydraulically actuated processes of gripping and cutting as well as opening the gripper and pivoting the tilting device are usually implemented with the aid of pressure sequencing controls. A hydraulic sequencing valve is used to close the gripper and, once the gripper is fully closed, to start up and pivot out the cutting element via the same hydraulic line. With the aid of a further hydraulic sequencing valve, both the opening of the gripper and, after the gripper has been fully opened, the actuation of the tilting device for pivoting the gripper and saw unit into their cutting position are accomplished via a further hydraulic line in the depositing position. A hydraulic valve is used to switch between the two hydraulic lines, but at least one hydraulic line must have a connection to the hydraulic fluid tank when not connected in order to enable the cutting element to retract after the cut has been completed. This connection to the hydraulic fluid tank means that after the gripper is fully opened and the tilting device is actuated, it is no longer held in the cutting position after switching to the unconnected state, for example to position the felling head on the harvested material and activate the cutting element, but can sink down again due to gravity. This proves to be disadvantageous in operation, particularly after the tree has been cut through, because the tilting device is pivoted into its depositing position by the weight of the cut tree, and therefore essentially uncontrolled.

It is therefore the object of the invention to realize a device for timber harvesting with a hydraulically controlled felling head which avoids this disadvantage and enables the tilting device to be pivoted from the cutting position to the depositing position in a controlled manner.

These objects are realized by the features of claim 1. Claim 1 relates to a device for timber harvesting having a hydraulically controlled felling head, which can be attached to the boom arm of a vehicle and comprises a gripper and saw unit and a tilting device, wherein the gripper and saw unit has at least one pair of two gripper arms for harvested material, which can be actuated by a first hydraulic cylinder and can be pivoted between an open and closed state, and a hydraulically activatable cutting element for cutting through the harvested material, and can be pivoted from a depositing position into a cutting position for the harvested material by means of the hydraulically actuatable tilting device, wherein the gripper arms of the gripper and saw unit can be pivoted into the open state and the tilting device can be pivoted into its cutting position by pressurizing a first hydraulic line, and the gripper arms can be pivoted into the closed state and the cutting element is activated for cutting through the harvested material by pressurizing a second hydraulic line. According to the invention, it is proposed here that the tilting device can be pivoted from its cutting position into its depositing position by pressurizing the second hydraulic line in a pressure range in which the cutting element remains in an inactive state.

According to the invention, two hydraulic lines are thus sufficient for opening the gripper, pivoting the felling head into the cutting position, closing the gripper, activating the cutting element and pivoting the felling head into the depositing position, wherein a pressure range of the second hydraulic line is utilized for pivoting the felling head into the depositing position, which generally remains unused. Activating the cutting element, i.e. starting it up and pivoting it out of the saw box, requires a minimum pressure in the second hydraulic line, which is subsequently also referred to as the third limit value and can be set via a hydraulic valve, subsequently referred to as the fifth hydraulic valve. By suitable control of the second hydraulic line, a pressure range can be maintained at which the cutting element remains in an inactive state and which, according to the invention, is used for another work process, namely to enable the tilting device to be pivoted from its cutting position into its depositing position.

One possible embodiment provides, for example, that a first hydraulic cylinder designed as a double-acting hydraulic cylinder is provided for hydraulic actuation of the at least one pair of grippers, which is connected to the first hydraulic line for opening the at least one pair of grippers and is connected to the second hydraulic line for closing the at least one pair of grippers, and a second hydraulic cylinder is provided for hydraulic activation of the cutting element, which is connected to the second hydraulic line, and a third hydraulic cylinder, which is connected to the first hydraulic line, is provided for hydraulic actuation of the tilting device, wherein a first hydraulic valve provided with a non-return valve is provided, which is connected on the input side to the first hydraulic line and is connected on the output side to a second hydraulic valve, which is connected to the third hydraulic cylinder designed as a single-acting hydraulic cylinder, and to a third hydraulic valve, via which the second hydraulic valve is connected to the first hydraulic line, wherein the third hydraulic valve is designed to block when pressure is applied to the first hydraulic line and to open in a pressure range when pressure is applied to the second hydraulic line, in which the cutting element remains in an inactive state, and the second hydraulic valve is designed to conduct hydraulic fluid from the first hydraulic valve to the third hydraulic cylinder when a switch is actuated by the gripper arms pivoted into their open state, and to conduct hydraulic fluid from the third hydraulic cylinder to the third hydraulic valve when the switch is not actuated when the gripper arms are closed. This hydraulic circuit performs the following function:

If the gripper is to be opened, the first hydraulic cylinder is actuated using the first hydraulic line and the gripper opens. With the help of the first hydraulic valve, hydraulic fluid is fed from the first hydraulic line to the second hydraulic valve, which is initially still blocked because it is only opened when the switch is actuated. In addition, hydraulic fluid is also directed to the third hydraulic valve, which also still blocks because it is in a blocking state when pressure is applied to the first hydraulic line.

Only when the gripper is fully open and thus in its open state does it activate the second hydraulic valve via the switch, which thus becomes conductive and allows hydraulic fluid to flow from the first hydraulic valve into the third hydraulic cylinder of the tilting device. The third hydraulic cylinder is thus actuated, causing the tilting device to pivot the gripper and saw unit into its cutting position.

The gripper and saw unit can then be positioned on the harvested material. The two hydraulic lines are depressurized. However, the tilting device remains in its cutting position, as the third hydraulic valve remains in the blocking state. The hydraulic fluid cannot flow out of the third hydraulic cylinder via the first hydraulic valve either, as it is fitted with a non-return valve. The gripper and saw unit thus maintains its position and enables precise positioning on the harvested material.

If the gripper is to be closed, the first hydraulic cylinder is actuated using the second hydraulic line and the gripper closes. The third hydraulic valve is now opened so that hydraulic fluid from the third hydraulic cylinder can flow into the first hydraulic line via the second hydraulic valve and the third hydraulic valve. The tilting device could therefore be pivoted into the depositing position, but the harvested material has not yet been cut through, so that the tilting device is still largely unloaded.

After cutting through the harvested material, the cutting element is deactivated by depressurizing the second hydraulic line. The third hydraulic valve thus blocks again because it only becomes conductive when the second hydraulic line is pressurized. Unintentional opening of the gripper arms can be prevented by connecting the first hydraulic cylinder to the second hydraulic line via a load-holding valve, which maintains the pressure in the first hydraulic cylinder even when the second hydraulic line is depressurized.

By pressurizing the second hydraulic line in a pressure range in which the cutting element remains in an inactive state, the third hydraulic valve is opened so that hydraulic fluid can flow out of the third hydraulic cylinder via the second hydraulic valve and the third hydraulic valve into the first hydraulic line. The tilting device can thus be pivoted into the depositing position, which is achieved by the weight of the cut harvested material, wherein the third hydraulic cylinder is returned to its retracted position.

For overload protection for the third hydraulic cylinder, the first hydraulic valve is preferably designed to conduct hydraulic fluid from the second hydraulic valve to the first hydraulic line when a first limit value of the output-side pressurization is exceeded.

Furthermore, a fourth hydraulic valve is provided as a load-holding valve with an overload protection for the first hydraulic cylinder, which is connected on the input side to the second hydraulic line and on the output side to the first hydraulic cylinder, wherein the fourth hydraulic valve is designed to conduct hydraulic fluid from the first hydraulic cylinder to the second hydraulic line when a second limit value of the output-side pressurization is exceeded. As already mentioned, the load-holding valve ensures that the pressure in the first hydraulic cylinder is maintained, even if the second hydraulic line is depressurized. The fourth hydraulic valve thus prevents the gripper from opening unintentionally, but allows the gripper to open in the event of an imminent overload.

In addition, a fifth hydraulic valve can be provided, which is connected on the input side to the second hydraulic line and on the output side to a hydraulic motor and the second hydraulic cylinder for the cutting element, wherein the fifth hydraulic valve is designed to conduct hydraulic fluid from the second hydraulic line to the hydraulic motor and the second hydraulic cylinder when a third limit value of the pressure applied on the input side is exceeded. The third limit value is selected so that the fifth hydraulic valve only opens when the gripper is fully closed. In this way, the cutting element is also not put into operation until the gripper is completely closed. After start-up, the saw is pivoted out via the hydraulic motor using the second hydraulic cylinder. Activating the cutting element, i.e. starting it up and pivoting it out of the saw box, therefore requires a minimum pressure in the second hydraulic line in the form of this third limit valve, which can be set via the fifth hydraulic valve. As already mentioned, a pressure range can be maintained below the third limit value by suitable control of the second hydraulic line, at which the cutting element remains in an inactive state and which is used for another work process, namely to enable the tilting device to pivot from its cutting position into its depositing position.

Furthermore, it is proposed that a first accumulator for leakage oil from the hydraulic motor is provided, which is connected to the first hydraulic line. This first accumulator collects leakage oil from the hydraulic motor and returns it to the first hydraulic line after the sawing process has been completed.

In order to prevent the hydraulic motor from looping incorrectly when pressure is applied to the first hydraulic line, a sixth hydraulic valve is proposed, which is connected on the input side to the first hydraulic line and on the output side to the hydraulic motor, wherein the sixth hydraulic valve is designed to conduct hydraulic fluid from the hydraulic motor into the first hydraulic line and to block it in the opposite direction.

Furthermore, a second accumulator for hydraulic fluid of the second hydraulic cylinder is proposed for the resetting movement of the second hydraulic cylinder. The second accumulator is thus used to pivot the cutting element back into place after the cutting process has been completed.

Figure 2:
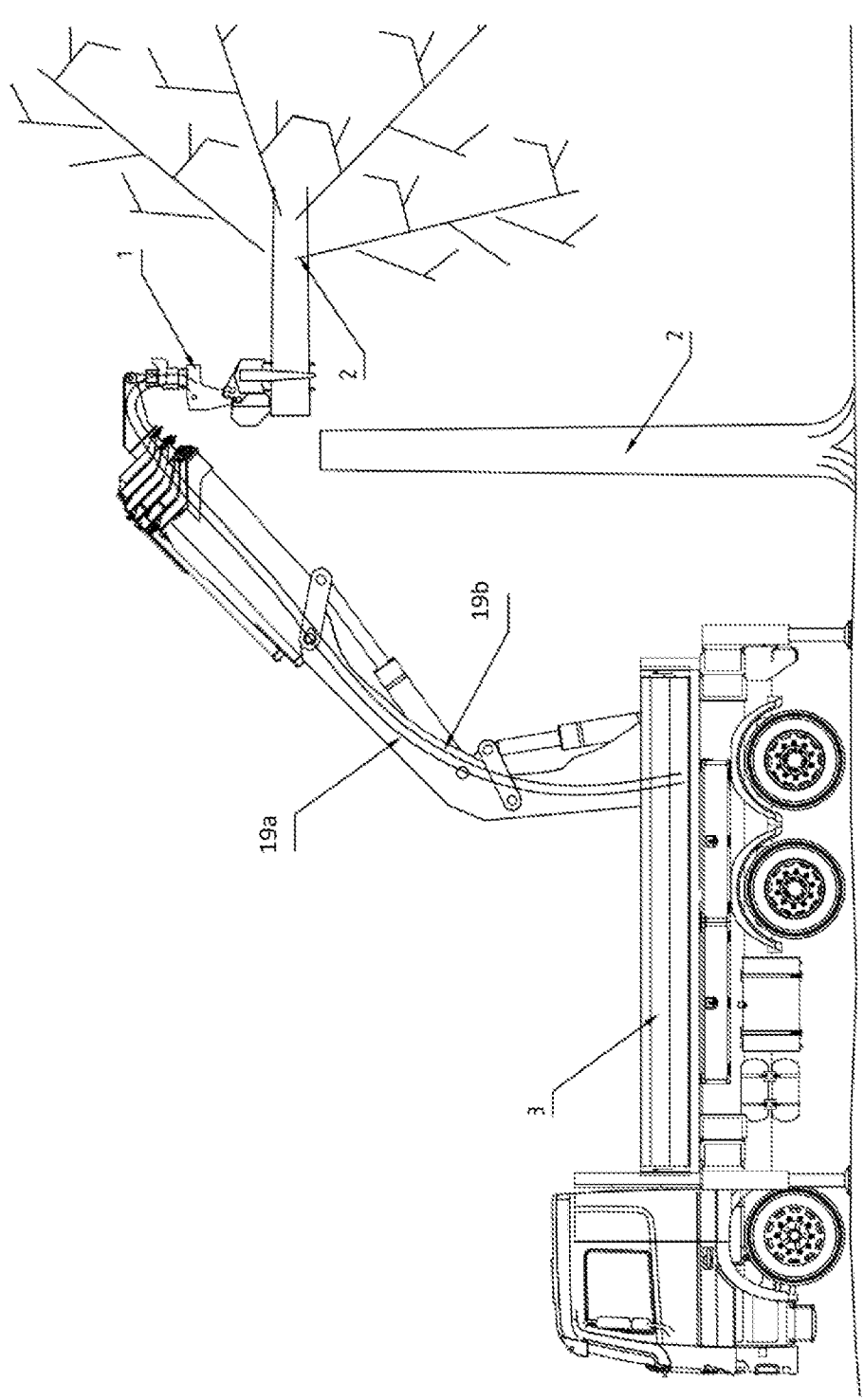
Figure 3A:
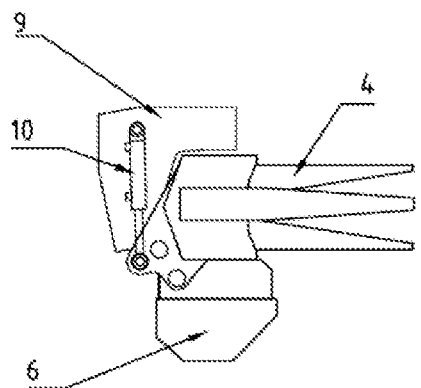
Figure 3B:
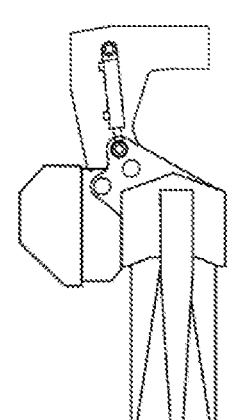
Figure 4A:
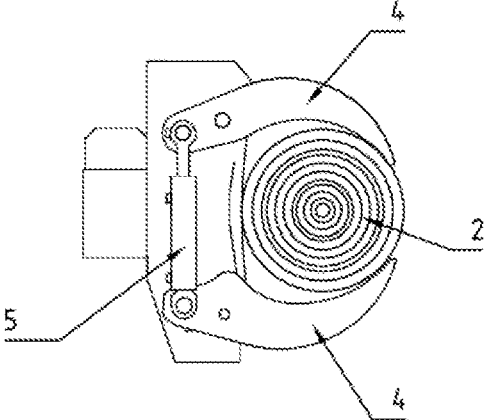
Figure 4B:
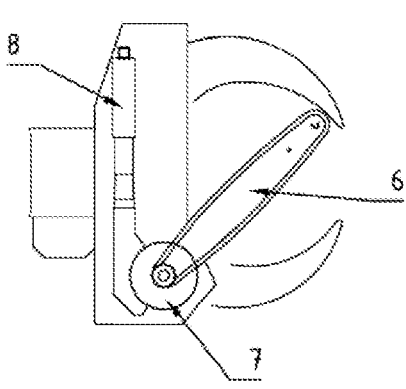
Figure 5:
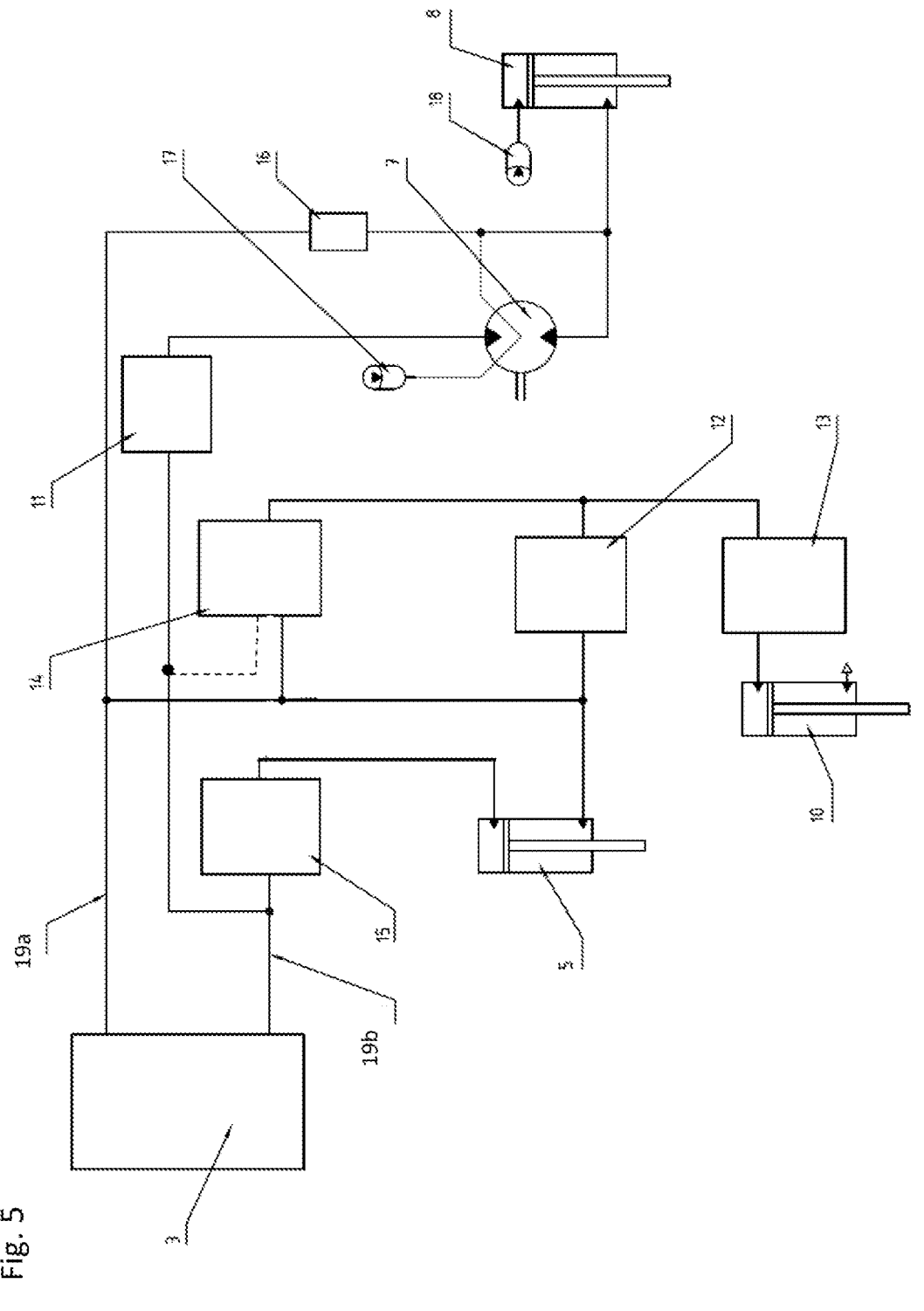

The invention will be explained in more detail below with reference to exemplary embodiments with the aid of the accompanying figures, wherein:

FIG. 1 shows a schematic view of a vehicle with a felling head according to the invention with a gripper and saw unit in the cutting position, FIG. 2 shows a schematic view of a vehicle with a felling head according to the invention with a gripper and saw unit in the depositing position, FIG. 3a shows an enlarged view of the felling head in the cutting position, FIG. 3b shows an enlarged view of the felling head in the depositing position, FIG. 4a shows a view of the gripper and saw unit seen from above, FIG. 4b shows a view of the gripper and saw unit seen from below, so that the cutting element is visible, and FIG. 5 shows a possible embodiment of a hydraulic circuit for a felling head according to the invention.

Reference is first made to FIGS. 1 to 4 in order to explain the general mode of operation of a felling head according to the invention. FIG. 1 shows a schematic view of a vehicle 3 with a felling head 1 according to the invention with a gripper and saw unit in the cutting position, and FIG. 2 shows a schematic view of the vehicle 3 with a felling head 1 according to the invention with a gripper and saw unit in the depositing position.

The felling head 1 is attached to a boom arm of the vehicle 3, which is controlled by an operator from the vehicle 3 in such a way that gripper arms 4 (see FIG. 3) arranged on the gripper and saw unit embrace the harvested material 2, such as a tree trunk. Subsequently, a corresponding hydraulic system exerts a closing pressure on the gripper arms 4 via the second hydraulic line 19b shown in FIGS. 1 and 2 and a first hydraulic cylinder 5 (see FIG. 4a), which fix the tree trunk in place with a pincer-like movement. After the tree trunk has been fixed, the cutting element 6 (see FIG. 4b) can be pivoted using a second hydraulic cylinder 8 so that the tree trunk is cut through. The cutting element 6 is designed as a chainsaw and is usually pivotably mounted in a saw box, wherein it can be put into operation using a hydraulic motor 7 arranged in the saw box (see FIG. 4b) and pivoted out of the saw box using the second hydraulic cylinder 8 in order to cut through a tree trunk held by the gripper arms 4 in an area below the gripper arms 4. After cutting through the tree trunk, the gripper and saw unit can be pivoted using a tilting device 9 (see FIG. 3) so that the gripper arms 4 are moved from their cutting position as shown in FIG. 3a, in which the gripper arms 4 are oriented essentially horizontally and their gripper pivot axes are correspondingly vertical, co a depositing position as shown in FIG. 3b, in which the gripper arms 4 are oriented essentially vertically and their gripper pivot axes are correspondingly horizontal. The severed tree trunk can then be deposited in a controlled manner by appropriate activation of the boom arm, wherein the gripper arms 4 are opened via the first hydraulic line 19a shown in FIGS. 1 and 2 and a correspondingly resetting movement of the first hydraulic cylinder 5 in order to release the severed tree trunk. With the aid of a third hydraulic cylinder 10 (see FIG. 3) and the tilting device 9, the gripper and saw unit can be moved from its depositing position as shown in FIG. 3b back to its cutting position as shown in FIG. 3a.

A possible embodiment of a hydraulic circuit for a felling head according to the invention is explained below with reference to FIG. 5. If the gripper is to be opened, the first hydraulic cylinder 5 is actuated using the first hydraulic line 19a and the gripper opens. With the aid of the first hydraulic valve 12, hydraulic fluid is conducted from the first hydraulic line 19a to the second hydraulic valve 13, which initially still blocks because it is only opened by actuating a switch. In addition, hydraulic fluid is also conducted to the third hydraulic valve 14, but this also still blocks because it is in a blocking state when the first hydraulic line 19a is pressurized.

Only when the gripper is fully open and thus in its open position does it activate the second hydraulic valve 13 via a switch, which thus becomes conductive and allows hydraulic fluid to flow from the first hydraulic valve 12 into the third hydraulic cylinder 10 of the tilting device 9. The third hydraulic cylinder 10 is thus actuated, causing the tilting device 9 to pivot the gripper and saw unit into its cutting position.

The gripper and saw unit can then be positioned on the harvested material. The two hydraulic lines 19a, 19b are depressurized.

The third hydraulic valve 14 remains in the blocking state. The hydraulic fluid cannot flow out of the third hydraulic cylinder 10 via the first hydraulic valve 12 either, as it is fitted with a non-return valve. The gripper and saw unit thus holds its position and enables precise positioning on the harvested material 2.

If the gripper is to be closed, the first hydraulic cylinder 5 is actuated using the second hydraulic line 19b and the gripper closes. The third hydraulic valve 14 is now opened so that hydraulic fluid could flow out of the third hydraulic cylinder 10 via the second hydraulic valve 13 and the third hydraulic valve 14 into the first hydraulic line 19a. The tilting device 9 could therefore be pivoted into the depositing position, but the harvested material 2 has not yet been cut through, so that the tilting device 9 is still largely unloaded.

After cutting through the harvested material 2, the cutting element 6 is deactivated by depressurizing the second hydraulic line 19b. The third hydraulic valve 14 thus blocks again because it only becomes conductive when the second hydraulic line 19b is pressurized. Unintentional opening of the gripper arms 4 can be prevented by connecting the first hydraulic cylinder 5 to the second hydraulic line 19b via a load-holding valve, which maintains the pressure in the first hydraulic cylinder 5 even when the second hydraulic line 19b is depressurized, as will be explained below.

By pressurizing the second hydraulic line 19b in a pressure range in which the cutting element 6 remains in an inactive state, the third hydraulic valve 14 is opened so that hydraulic fluid can flow out of the third hydraulic cylinder 10 via the second hydraulic valve 13 and the third hydraulic valve 14 into the first hydraulic line 19a. The tilting device 9 can thus be pivoted into the depositing position, which is achieved by the weight of the severed harvested material 2, wherein the third hydraulic cylinder 10 is returned to its retracted position. The third hydraulic valve 14 is opened when pressure is applied to the second hydraulic line 19b with the aid of a control line, indicated by a dashed line in FIG. 5, which is used to reduce the pressure in the second hydraulic line 19b upstream of the load-holding valve of the first hydraulic cylinder 5 to control the third hydraulic valve 14.

For overload protection for the third hydraulic cylinder 10, the first hydraulic valve 12 is also designed to direct hydraulic fluid from the second hydraulic valve 13 to the first hydraulic line 19a if a first limit value of the pressure applied on the output side is exceeded.

Furthermore, a fourth hydraulic valve 15 is provided, which fulfills the function of the above-mentioned load-holding valve and also serves as overload protection for the first hydraulic cylinder 5. The fourth hydraulic valve 15 is connected on the input side to the second hydraulic line 19*b* and on the output side to the first hydraulic cylinder 5, wherein the fourth hydraulic valve 15 is designed to conduct hydraulic fluid from the first hydraulic cylinder 5 to the second hydraulic line 19*b* when a second limit value of the pressure application on the output side is exceeded. The fourth hydraulic valve 15 thus prevents the gripper from opening unintentionally, but allows the gripper to open in the event of an imminent overload.

In addition, a fifth hydraulic valve 11 is provided, which is connected on the input side to the second hydraulic line 19*b* and on the output side to the hydraulic motor 7 and the second hydraulic cylinder 8 for the cutting element 6, wherein the fifth hydraulic valve 11 is designed to conduct hydraulic fluid from the second hydraulic line 19*b* to the hydraulic motor 7 and the second hydraulic cylinder 8 when the pressure on the input side exceeds a third limit value. The third limit value is selected so that the fifth hydraulic valve 11 only opens when the gripper is fully closed. In this way, the cutting element 6 is also not put into operation until the gripper is completely closed. After start-up, the saw is pivoted out via the hydraulic motor 7 using the second hydraulic cylinder 8. A possible value for the third limit value is 200 bar, for example, wherein the third hydraulic valve 14 is designed to open at a pressure in the second hydraulic line 19*b* of around 100 bar. As a result, the tilting device 9 can be pivoted when the second hydraulic line 19*b* is pressurized in a pressure range between 100 and 200 bar, at which the cutting element thus remains in an inactive state.

Furthermore, a first accumulator 17 is provided for leakage oil from the hydraulic motor 7, which is connected to the first hydraulic line 19*a*. This first accumulator 17 collects leakage oil from the hydraulic motor 7 and returns it to the first hydraulic line 19*a* after the sawing process has been completed.

In order to prevent the hydraulic motor 7 from looping incorrectly when pressure is applied to the first hydraulic line 19*a*, a sixth hydraulic valve 16 is provided, which is connected on the input side to the first hydraulic line 19*a* and on the output side to the hydraulic motor 7, wherein the sixth hydraulic valve 16 is designed to conduct hydraulic fluid from the hydraulic motor 7 into the first hydraulic line 19*a* and to block it in the opposite direction.

Furthermore, a second accumulator 18 for hydraulic fluid of the second hydraulic cylinder 8 is provided for the resetting movement of the second hydraulic cylinder 8. With the aid of the second accumulator 18, the cutting element 6 is thus pivoted back into place after the cutting process has been completed.

With the aid of the invention, a device for timber harvesting with a hydraulically controlled felling head 1 is realized, which enables the tilting device to be pivoted from the cutting position to the depositing position in a controlled manner.

The invention claimed is:

1. A device for timber harvesting having a hydraulically controlled felling head, which can be attached to the boom arm of a vehicle and comprises a gripper and saw unit and a tilting device, wherein the gripper and saw unit has at least one pair of two gripper arms for harvested material, which can be actuated by a first hydraulic cylinder and pivoted between an open and closed state, and a hydraulically activatable cutting element for cutting through the harvested material, and can be pivoted from a depositing position into a cutting position for the harvested material by the hydraulically actuatable tilting device, wherein the gripper arms of the gripper and saw unit can be pivoted into the open state and the tilting device can be pivoted into its cutting position by pressurizing a first hydraulic line, and the gripper arms can be pivoted into the closed state and the cutting element is activated for cutting through the harvested material by pressurizing a second hydraulic line, wherein the tilting device can be pivoted from its cutting position into its depositing position by pressurizing the second hydraulic line in a pressure range in which the cutting element remains in an inactive state.

2. The device according to claim 1, wherein a first hydraulic cylinder designed as a double-acting hydraulic cylinder is provided for hydraulic actuation of the at least one pair of grippers, which is connected to the first hydraulic line for opening the at least one pair of grippers and is connected to the second hydraulic line for closing the at least one pair of grippers, and a second hydraulic cylinder is provided for hydraulic activation of the cutting element, which is connected to the second hydraulic line, and a third hydraulic cylinder, which is connected to the first hydraulic line, is provided for hydraulic actuation of the tilting device, wherein a first hydraulic valve provided with a non-return valve is provided, which is connected on the input side to the first hydraulic line and is connected on the output side to a second hydraulic valve, which is connected to the third hydraulic cylinder designed as a single-acting hydraulic cylinder, and to a third hydraulic valve, via which the second hydraulic valve is connected to the first hydraulic line, wherein the third hydraulic valve is designed to block when pressure is applied to the first hydraulic line and to open in a pressure range when pressure is applied to the second hydraulic line, in which the cutting element remains in an inactive state, and the second hydraulic valve is designed to conduct hydraulic fluid from the first hydraulic valve to the third hydraulic cylinder when a switch is actuated by the gripper arms pivoted into their open state, and to conduct hydraulic fluid from the third hydraulic cylinder to the third hydraulic valve when the switch is not actuated when the gripper arms are closed.

3. The device according to claim 2, wherein the first hydraulic valve is designed to conduct hydraulic fluid from the second hydraulic valve to the first hydraulic line when a first limit value of the output-side pressurization is exceeded.

4. The device according to claim 2, wherein a fourth hydraulic valve is provided as a load-holding valve with an overload protection, which is connected on the input side to the second hydraulic line and on the output side to the first hydraulic cylinder, wherein the fourth hydraulic valve is designed to conduct hydraulic fluid from the first hydraulic cylinder to the second hydraulic line when a second limit value of the output-side pressurization is exceeded.

5. The device according to claim 2, wherein a fifth hydraulic valve is provided, which is connected on the input side to the second hydraulic line and on the output side to a hydraulic motor and the second hydraulic cylinder for the cutting element, wherein the fifth hydraulic valve is designed to conduct hydraulic fluid from the second hydraulic line to the hydraulic motor and the second hydraulic cylinder when a third limit value of the pressure applied on the input side is exceeded.

6. The device according to claim 2, wherein a first accumulator for leakage oil from the hydraulic motor is provided, which is connected to the first hydraulic line.

7. The device according to claim 2, wherein a sixth hydraulic valve is provided, which is connected on the input side to the first hydraulic line and on the output side to the hydraulic motor, wherein the sixth hydraulic valve is designed to conduct hydraulic fluid from the hydraulic motor into the first hydraulic line and to block it in the opposite direction.

8. The device according to claim 2, wherein a second accumulator for hydraulic fluid of the second hydraulic cylinder is provided for resetting movement of the second hydraulic cylinder.

\* \* \* \* \*